March 18, 1941. W. A. DAVIS Re. 21,753

EXTENSION DEVICE

Original Filed Jan. 30, 1935

INVENTOR
Willard A. Davis
BY
Nathaniel Frucht
ATTORNEY

Reissued Mar. 18, 1941

Re. 21,753

UNITED STATES PATENT OFFICE 21,753

EXTENSION DEVICE

Willard A. Davis, Edgewood, R. I., assignor, by mesne assignments, to Gemex Company, a corporation of New Jersey Original No. 2,156,973, dated May 2, 1939, Serial No. 4,099, January 30, 1935. Application for reissue July 19, 1940, Serial No. 346,431

5 Claims. (Cl. 24—71)

My present invention relates to the jewelry art, and has particular reference to extension devices suitable for bracelets and watch chains.

Extension devices heretofore used have included a plurality of members foldable into contracted relation, and have occasionally included a ratchet mechanism to provide closer length adjustment. The ratchet mechanism has either been an integral part of the extension device, whereby the ratchet parts are engaged when the extension device is in folded relation, and are not engaged when the extension device is opened to extended position, or has been independently operated, as by means of manually operable levers or pressure members.

The first arrangement has the disadvantage that any definite length adjustment cannot be automatically retained, the over-all length being adjusted after each closing of the extension device. It is a principal object of my invention to provide a construction which maintains any selected length adjustment and does not require resetting.

The second arrangement, while possessing constant setting, has heretofore required lateral movements of releasing mechanism to release the ratchet parts, the releasing mechanism being difficult to operate, and particularly when the bracelets are small, and being relatively unsightly in appearance. It is a further object of my invention to provide a releasing mechanism that does not require lateral operating movements, and that does not change the general appearance of the extension device or of the bracelet.

It is an additional object of my invention to provide a novel construction whereby the extension device may be opened when in folded position, to either release the foldable parts and retain the ratchet parts in cooperative set position, or to simultaneously release both the foldable parts and the ratchet parts.

With the above and other objects and advantageous features in view, my invention consists of a novel arrangement of parts more fully disclosed in the detailed description following, in conjunction with the accompanying drawing, and more specifically defined in the claims appended thereto.

Figure 1:
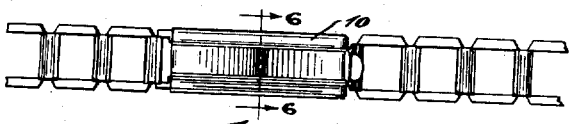
Fig. 1 is a plan view of an extension device embodying the novel invention.

I have found it desirable to provide an extension device with a ratchet mechanism which is controlled by the user to permit opening and closing of the foldable parts without change in the ratchet mechanism, to permit change in the ratchet parts at any time whether the foldable parts are in open or closed relation, and to permit simultaneous release of the foldable parts from closed relation and of the cooperating ratchet parts. To this end, I have provided a finger tab which may be moved to open the foldable parts, and which may be further moved to release the ratchet parts ,the structure being designed to be inconspicuous and without lateral projections, levers, knobs, or the like.

Referring to the drawing, the extension device 10 is adapted to be utilized as part of a bracelet or a watch chain, and includes a top plate 11, an intermediate plate 12 hinged to one end thereof, and a base plate 13 hinged to the intermediate plate, the base plate having the usual end connection 14 for securing to one end of a bracelet. An adjusting link 15 is slidably mounted in the top plate, between the rolled edges 16, 17 thereof, and has an end formation 18 for hingedly connecting to the other bracelet end. The base plate has spaced laterally projecting catch elements 19 adapted to engage the ends of the rolled edges when the plates are folded between the rolled edges, for detachable securing of the parts in contracted relation.

Figure 3:
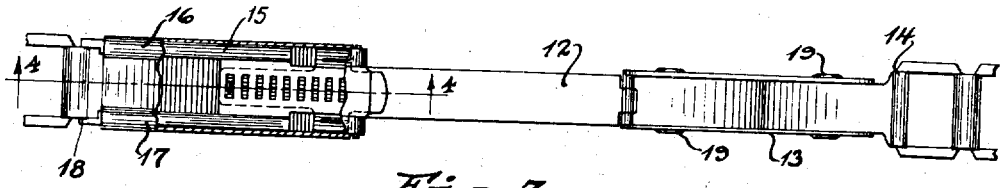
Fig. 3 is an enlarged bottom plan view of the extension device in open position, parts being broken away.
Figure 6:
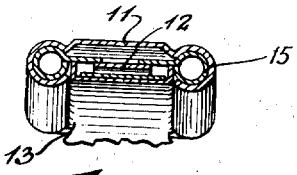
Fig. 6 is an enlarged section on the line 6—6 of Fig. 1.

As shown in Figures 3 and 6, edges 16 and 17 and the top of plate 11 form an elongated channel in which adjusting link 15 slides. As link 15 is spaced inwardly toward the top of plate 11 from the bottoms of edges 16 and 17, a nesting space is provided for intermediate plates 12 and 13, so that the channel in plate 11 remains open regardless of the longitudinal position of adjusting link 15 in the top plate.

Figure 2:
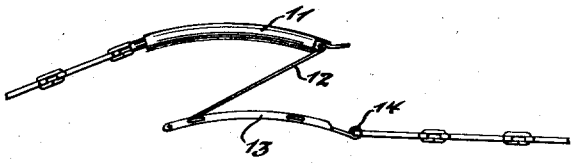
Fig. 2 is a side elevation of Fig. 1, the foldable parts being in opened relation.

Extensible buckle 10 (Figure 2) is curved and much longer than it is thick to provide ample extensibility, yet permit the buckle to lie flat against and conform to the wrist, precluding unsightliness and interference with the sleeve.

Figure 4:
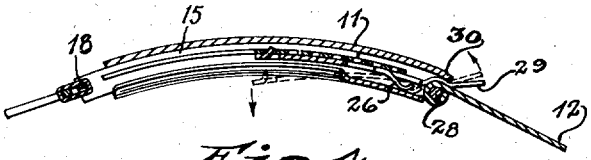
Fig. 4 is a section on the line 4—4 of Fig. 3.
Figure 7:
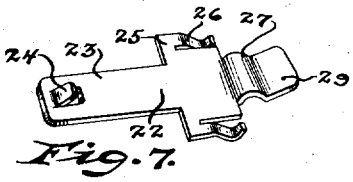
Fig. 7 is a perspective of one construction suitable for the ratchet pawl.

As indicated in Figs. 3 and 4, the adjusting link has a plurality of central openings or detents 20 at the inner end thereof, the outer end being cut to simulate the general appearance of a bracelet or watch chain link, and is held against removal from the top plate in any desired manner, as by forming a stop 21 in the top plate to engage the inner part of the adjusting link. A pawl 22, see Fig. 7, is mounted in the top plate, and includes a spring tongue 23 having a rearwardly bent tooth 24 selectively engageable with the detents 20, sides 25 which have yieldable spring fingers 26 frictionally engaging the rolled edges 16 and 17, and arcuate portion 27 which rests on the hinge 28 between the top plate and the intermediate plate, and functions as a fulcrum, and a finger piece 29 which extends past the edge 30 of the top plate. Although the described construction of the pawl locks it in place in the top plate, the part 27 may if desired be formed as a hinge and mounted on a pivot pin secured in the sides 16, 17. All the parts are preferably made of stamped metal.

Figure 5:
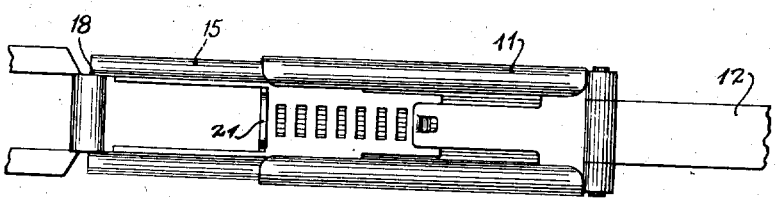
Fig. 5 is an enlarged view of the ratchet parts, in extended relation.

The operation of the novel extension device may now be explained. When the parts are in the relation shown in Fig. 4, the foldable plates are in contracted relation and the adjusting link and pawl are in shortest length adjustment. An opening contact of the finger piece by a finger nail, the bracelet or watch strap being on the wrist, releases the catches 19 from engagement with the ends of the top plate edges, and opens the foldable plates to extended position; the ratchet parts are not released, however, and the length adjustment remains as set. If, however, the finger piece be pressed further against the edge of the top plate, the pawl will turn on the hinge 28, as indicated by the dotted lines in Fig. 4, and release the ratchet mechanism. A slight opening movement of the finger piece thus releases the foldable parts, and a stronger movement releases the ratchet parts. When the ratchet parts are released, and slide apart as indicated in Fig. 5, the adjusting link may be ratcheted inwardly, whether the foldable parts are in extended or in contracted relation.

While I have described a specific constructional embodiment of my invention, it is obvious that desired changes in the size and material of the parts, in the relative arrangement and in the relative functioning, may be made to suit the requirements for different bracelets and watch chains, within the spirit and the scope of the invention as defined in the appended claims.

I claim:

1. An extensible buckle greater in length than breadth, said buckle adapted to be used with a pair of bracelet sections in turn adapted to be attached to a wrist watch or the like, one of said sections including a plurality of folding links hinged together and to said buckle and narrower than said buckle so as to be foldable into nested relationship within said buckle, said buckle comprising, in combination, a top link adapted to be connected to the end folding link of said last-mentioned section, said top link having opposed longitudinal wall portions and a top portion and open at the bottom to receive said folding links, an adjusting link member adapted to be connected to the other of said bracelet sections and slidably mounted in said top link between said wall portions for sliding longitudinal movement relative thereto, a thin substantially planar control member, means for pivotally mounting said members on said top link, said control member being movable transversely only with respect to the longitudinal dimensions thereof, and a finger piece on one end of said control member extending from one end of said top link between the planes of said wall portions for moving said control member, one of said members having a series of ratchet teeth formed along a portion of its length and the other of said members having a pawl thereon, said pawl and said ratchet teeth being juxtaposed within said top link so that transverse movement of said finger piece relative to said top link separates said pawl and said ratchet teeth whereby said adjusting link member is freely slidable in said top link.

2. An extensible buckle greater in length than breadth, said buckle adapted to be used with a pair of bracelet sections in turn adapted to be attached to a wrist watch or the like, one of said sections including a plurality of folding links hinged together and to said buckle and narrower than said buckle so as to be foldable into nested relationship within said buckle, said buckle comprising, in combination, a top link adapted to be connected to one of said sections and having a top portion and opposed longitudinal wall portions extending therefrom to form an elongated channel open at the bottom to receive said folding links, an adjusting link member adapted to be connected to the other of said bracelet sections and mounted in said top link between said wall portions and spaced from the bottom edges thereof for sliding longitudinal movement relative thereto between extended and contracted positions, so that said top link is open at the bottom regardless of the position of said adjusting link member to provide a space for said folding links when in their nested position, a thin substantially planar control member, means for pivotally mounting said member on said top link, said control member being movable transversely only with respect to the longitudinal dimensions thereof, and a finger piece on one end of said control member extending from one end of said top link between the planes of said wall portions, for moving said control member, one of said members having a series of ratchet teeth formed along a portion of its length and the other of said members having a pawl thereon, said pawl and said ratchet teeth being juxtaposed within said top link so that transverse movement of said finger piece relative to said top link separates said pawl and said ratchet teeth whereby said adjusting link member is freely slidable in said top link.

3. An extensible buckle greater in length than breadth, said buckle adapted to be used with a pair of bracelet sections in turn adapted to be attached to a wrist watch or the like, one of said sections including a plurality of folding links hinged together and to said buckle and narrower than said buckle so as to be foldable into nested relationship within said buckle, said buckle comprising, in combination, a top link curved to substantially conform to the contour of a portion of the wrist, said top link being substantially greater in length and breadth than in thickness and having opposed longitudinal wall portions and a top portion and open at the bottom to receive said folding links, an adjusting link member having a curvature substantially the same as said top link member and slidably mounted in the latter between said wall portions for sliding longitudinal movement relative thereto, a control member, means for pivotally connecting said member to said housing link and movable transversely only with respect to the longitudinal dimensions thereof, and a finger piece on one end of said control member extending from one end of said top link between the planes of said wall portions, for moving said control member, one of said members having a series of ratchet teeth along a portion of its length and the other of said members having a pawl thereon, said pawl and said ratchet teeth being juxtaposed within said top link so that transverse movement of said finger piece relative to said top link member separates said pawl and said ratchet teeth, whereby said adjusting link member is freely slidable in said top link.

4. In an extension device, a link member, a second link member slidably connected thereto, cooperating ratchet and pawl elements on said link members to hold them in relative adjusted position, a third link member hingedly connected to one of said other members and adapted to fold in contracted relation thereto, cooperating snap parts on said third link member and one of said other link members for releasably retaining said third link member in contracted relation thereto, and manually movable means connected to one of said elements and engageable with one of said link members for releasing said snap parts and moving said one element to disengage it from the other.

5. In an extension device, a link member, a second link member slidably connected thereto, cooperating ratchet and pawl elements on said link members to hold them in relative adjusted position, a third link member hingedly connected to one of said other members and adapted to fold in contracted relation thereto, cooperating snap parts on said third link member and one of said other link members for releasably retaining said third link member in contracted relation thereto, and manually movable means connected to one of said elements and engageable with one of said link members for releasing said snap parts and moving said one element to disengage it from the other, said manually movable means including a part engageable by the finger extending from one end of said first link member.

WILLARD A. DAVIS.